(12) United States Patent
Boock

(10) Patent No.: US 7,717,228 B2
(45) Date of Patent: May 18, 2010

(54) SOUND ABSORBING ELEMENT AND METHOD FOR PRODUCING A SOUND ABSORBING ELEMENT

(75) Inventor: Klaus Boock, Timmdorf (DE)

(73) Assignee: Airbus Deutschland GmbH, Hamburg (DE)

(*) Notice: Subject to any disclaimer, the term of this patent is extended or adjusted under 35 U.S.C. 154(b) by 33 days.

(21) Appl. No.: 12/066,466

(22) PCT Filed: Sep. 22, 2006

(86) PCT No.: PCT/EP2006/009254

§ 371 (c)(1),
(2), (4) Date: Apr. 2, 2008

(87) PCT Pub. No.: WO2007/039153

PCT Pub. Date: Apr. 12, 2007

(65) Prior Publication Data

US 2008/0196968 A1  Aug. 21, 2008

Related U.S. Application Data

(60) Provisional application No. 60/720,640, filed on Sep. 26, 2005.

(30) Foreign Application Priority Data

Sep. 26, 2005  (DE) ........................ 10 2005 045 844

(51) Int. Cl.
*F16F 15/04* (2006.01)
(52) U.S. Cl. ........................ 181/208; 181/207; 181/290
(58) Field of Classification Search ................. 181/207, 181/208, 210, 213, 290, 292, 295; 244/1 N
See application file for complete search history.

(56) References Cited

U.S. PATENT DOCUMENTS

| 1,972,005 A | 8/1934 | Berbeck |
| 2,111,326 A | 3/1938 | Norris |
| 2,263,919 A | 11/1941 | Darragh, Jr. |

(Continued)

FOREIGN PATENT DOCUMENTS

DE  2632290  6/1979

(Continued)

OTHER PUBLICATIONS

German Office Action dated Apr. 5, 2006 for application No. 10 2005 045 844.0-53, 4 pages.

*Primary Examiner*—Jeffrey Donels
*Assistant Examiner*—Jeremy Luks
(74) *Attorney, Agent, or Firm*—Christopher Paradies; Fowler White Boggs P.A.

(57) ABSTRACT

A sound absorbing element, in one example, includes a first wall area, a second wall area as well as a plurality of spring elements. In this arrangement, the first wall area and the second wall area are arranged so as to be spaced apart by a clear space. In one example, the plurality of spring elements are arranged in the clear space and connect the first wall area and the second wall area to each other. By pre-tensioning the plurality of spring elements to a state in which their spring constant approaches zero, significant decoupling between the first and the second wall areas may occur, with accompanying sound noise reduction.

7 Claims, 2 Drawing Sheets

U.S. PATENT DOCUMENTS

| | | | | |
|---|---|---|---|---|
| 4,064,960 A | * | 12/1977 | Murakami | 181/210 |
| 4,275,801 A | | 6/1981 | Bschorr | |
| 4,317,503 A | * | 3/1982 | Soderquist et al. | 181/290 |
| 4,489,991 A | | 12/1984 | Delam | |
| 4,558,296 A | * | 12/1985 | Thoren | 336/100 |
| 4,600,078 A | * | 7/1986 | Wirt | 181/286 |
| 4,635,882 A | * | 1/1987 | SenGupta et al. | 244/119 |
| 5,465,679 A | * | 11/1995 | Mardikian | 114/363 |
| 5,710,396 A | * | 1/1998 | Rogers | 181/208 |
| 5,777,279 A | * | 7/1998 | Parker et al. | 181/287 |
| 5,800,888 A | * | 9/1998 | Yasumoto et al. | 428/36.91 |
| 5,845,459 A | * | 12/1998 | Nathan | 52/788.1 |
| 5,872,341 A | * | 2/1999 | Nielsen | 181/210 |
| 5,892,187 A | * | 4/1999 | Patrick | 181/286 |
| 6,007,890 A | * | 12/1999 | DeBlander | 428/72 |
| 6,065,717 A | * | 5/2000 | Boock | 244/1 N |
| 6,173,806 B1 | * | 1/2001 | Ito | 181/210 |
| 6,260,660 B1 | * | 7/2001 | Yoerkie et al. | 181/290 |
| 6,266,427 B1 | * | 7/2001 | Mathur | 381/353 |
| 6,478,110 B1 | * | 11/2002 | Eatwell et al. | 181/207 |
| 6,815,044 B2 | * | 11/2004 | Boock | 428/172 |
| 2002/0046901 A1 | * | 4/2002 | Zapfe | 181/206 |
| 2002/0172783 A1 | * | 11/2002 | Hawkins et al. | 428/34.1 |
| 2004/0154861 A1 | * | 8/2004 | Pompei | 181/290 |
| 2004/0238276 A1 | * | 12/2004 | Matias et al. | 181/290 |
| 2005/0006173 A1 | * | 1/2005 | Albin | 181/290 |
| 2005/0189165 A1 | * | 9/2005 | Mathur | 181/207 |
| 2006/0162998 A1 | * | 7/2006 | Hawkins et al. | 181/293 |

FOREIGN PATENT DOCUMENTS

| | | |
|---|---|---|
| DE | 3014207 C2 | 12/1983 |
| EP | 0098789 A2 | 1/1984 |

\* cited by examiner

SOUND ABSORBING ELEMENT AND METHOD FOR PRODUCING A SOUND ABSORBING ELEMENT

This application claims the benefit of the filing date of U.S. Provisional Patent Application No. 60/720,640 filed Sep. 26, 2005, and of German Patent Application No. 10 2005 045 844.0 filed Sep. 26, 2005, the disclosures of each of which are hereby incorporated herein by reference.

FIELD OF THE INVENTION

The field generally relates to the technical field of acoustics. In particular, the field relates to a sound absorbing elements. Furthermore, the field relates to a method for producing a sound absorbing element, as well as to an aircraft in which at least one sound absorbing element is included.

BACKGROUND OF THE INVENTION

Known sound absorbing elements are often designed as double-wall systems. Such double-wall systems as a rule consists of two wall areas that are connected to each other, spaced apart, by way of mechanical connections. Above all, when the double-wall systems for reasons of space must be thin, the sound absorbing measures of known double-wall systems in particular in the low-frequency range are relatively modest. In this case, the two wall areas of the known double-wall systems are coupled to each other in the most unfavourable manner by way of the air that is trapped between the wall areas, wherein in addition, coupling by way of the necessary mechanical connections takes place, as a result of which sound from the one wall area may also be transferred to the other wall area. As a result of this design, known double-wall systems, however, result in only modest sound absorbing measures, a situation which appears, however, in particular in the area of aircraft and space technology, to be inadequate with a view to passenger comfort.

Further state of the art includes an insulation glass unit, disclosed in DE3014207C2, with an interior pane, an exterior pane and a gas filling in the clear space. At least one of the rims of at least one of the panes is held, by means of a sprung end unit, in a dislocatable manner so as to oscillate when exposed to sound. In the central region, the spring function of the end unit comprises an substantially horizontal section, along which the operating point of the end unit travels when subjected to sound.

SUMMARY OF THE INVENTION

A sound absorbing element, in one example, comprises at least a double-wall, where the sound absorbing element coupling of the individual walls is reduced when compared to known double-wall systems.

Thus, according to a first embodiment, a sound absorbing element comprises a first wall area, a second wall area and a plurality of spring elements. In this arrangement, the first wall area is arranged so as to be spaced apart from the second sound absorbing element by a clear space. In this clear space, a plurality of spring elements are arranged, and the plurality of spring elements connect the first wall area and the second wall area to each other. The plurality of spring elements have decreasing spring functions and by pre-tensioning, may be brought to a state in which their spring constant approaches zero so that the dynamic coupling between the first and the second wall area by way of springs, also largely approaches zero. In order to achieve the greatest possible dynamic decoupling between the first wall area and the second wall area, one may pre-tension a plurality of spring elements, as a result of which, in the low-frequency range, far-reaching decoupling between the first and the second wall area may be achieved. While in the above description, the sound absorbing element comprises two wall areas that are spaced apart from each other, alternatively, the sound absorbing element may also comprise three or more wall areas, each being decoupled from each other by spring elements.

In order to generate a pre-tension acting on the springs, the clear space through which the first wall area and the second wall area face each other may be subjected to negative pressure, as a result of which the plurality of spring elements are pre-tensioned. Apart from the pre-tension effect, which may be achieved by such evacuation of the clear space, subjecting this clear space to negative pressure may have a further positive effect in that, as a result of this, coupling of the first and the second wall by the air that is usually trapped in the clear space may be minimized. The high loads that may occur as a result of such evacuation of the clear space are taken up by way of the spring elements, whose spring constant in the load range resulting from the negative pressure is set such that it approaches zero, as a result of which dynamically almost no loads may be transferred any longer.

In order to achieve such a spring constant, according to an embodiment, each one of the plurality of spring elements has a spring function $F(x)$ which at least in sections has a decreasing region. Thus, the spring function $F(x)$ may be curved in a concave manner in a certain region, in which it preferably comprises a high point or maximum, in which the spring constant adjusts to zero, as a result of slope formation. In the region around this high point, the spring constant, while as a result of slope formation is not exactly zero, nevertheless approaches zero, which with a view to sound absorption may have a favourable effect in that in this region dynamically almost no loads are transferred any longer.

An attempt is made to build up pre-tension to such an extent that the spring constant in the decreasing spring functions area sets itself at zero; however, as a rule, this point may be difficult to set. However, good results may be achieved even if the individual spring elements of the plurality of spring elements are pre-tensioned up to a region in which the slope, in other words, the spring constant, is less than 5% of the maximum value of the slope of the entire region of the spring function.

While any desired spring elements that has a decreasing spring function in sections may be used, good results may be obtained with the use of saucer springs or disc springs as spring elements.

To prevent the negative pressure generated in the clear space between the first wall area and the second wall area from dissipating, according to an embodiment, the first wall area and the second wall area may be rimmed by a flexible sealing element that seals the clear space off from the atmosphere.

In order to prevent the "snapping around" of the spring elements in the region in which their slope is almost zero, according to an embodiment, the first wall area and the second wall area, in addition, may be mutually supported by way of other spring elements as end stops, where the spring elements comprise a linear, progressive or any other type of spring function, which does not display a snap-around effect, or whose high point is in a different excursion range than the high point of the spring elements first mentioned within the context of the sound absorbing element. In this way, a situation may be achieved in which when the first-mentioned spring elements tend to snap around, the loads generated as a result of the vacuum may be further absorbed by the spring elements that in this document are the second spring elements mentioned.

As has already been explained in the introduction, known double-wall thin sound absorbing elements, in particular in the low-frequency range, may achieve only modest sound absorbing measures. By contrast, with the design of a sound absorbing element, according to an embodiment, considerable improvements may be achieved.

According to another embodiment, a method for producing a double-shell sound element is provided, in which in a first step, a first wall area is connected to a second wall area by way of a plurality of spring elements so that the first wall area and the second wall area are arranged so as to be spaced apart from each other by a clear space. In this arrangement, the spacing of the clear space is determined by an elongation of the spring elements. In a further step, the plurality of spring elements is pre-tensioned such that the first wall area and the second wall area are very largely dynamically decoupled mechanically. Instead of spacing only two wall areas apart by way of a plurality of spring elements, also a third or still more wall areas by spring elements may be arranged apart from the first or the second wall area such that an entire packet of wall areas that is arranged spaced apart from each other arises.

Since a particularly simple way of pre-tensioning the plurality of spring elements and of reducing the air sound transmission may be consisting of applying negative pressure to the clear space between the first and the second wall element, according to an embodiment, the clear space between the first wall element and the second wall element is sealed off from the atmosphere by a sealing element that borders the first wall area and the second wall area. By such a seal, a situation may be achieved in which negative pressure generated in the clear space remains constant over time rather than equalizing in relation to the exterior atmosphere. As an alternative, by a suction nozzle and a suction pump connected to it, the required negative pressure may be matched to the conditions of use.

As described above, according to an embodiment, the spring elements used must have a decreasing spring function at least in sections, in which range, the spring function forms a high point. Good decoupling of the first and the second wall area may be generated in that the plurality of spring elements are pre-tensioned to such an extent that the slope of the spring function, i.e. the spring constant, has a value of zero. Since this point is, however, difficult to set, it may be sufficient, as a rule, to pre-tension the plurality of spring elements up to a region in which their spring constant has a value which is less than 5% of their maximum spring constant. If the spring constant is set to such a value, substantial improvements in sound absorption may be achieved.

According to a further embodiment, furthermore, an aircraft is provided and at least an ice protection shield in the propeller region and the fuselage skin that is situated underneath it at some small distance are designed as a sound absorbing element, as described above. In particular, on the ice shield, which is attached to the fuselage in order to protect the fuselage from ice that has dropped off a propeller, extremely high noise levels occur. Such noise levels have to be kept away from the cabin interior for reasons of passenger comfort, which is why in particular the design of the ice shield in the form of the sound absorbing element according to an embodiment may prove to be advantageous.

BRIEF DESCRIPTION OF THE FIGURES

Below, the sound absorbing element is explained in an embodiment manner with reference to the enclosed drawings. The embodiment described in the figures by way of an example only serves to better understand the sound absorbing element; it must, in particular, not be interpreted in any way as limiting the protective scope of the invention. The following are shown.

In all the figures, identical or similar elements have the same or corresponding reference signs. The diagrams are not necessarily to scale, but they are suitable for reproducing qualitative size relationships.

DETAILED DESCRIPTION

The examples described and drawings rendered are illustrative and are not to be read as limiting the scope of the invention as it is defined by the appended claims.

Figure 1:
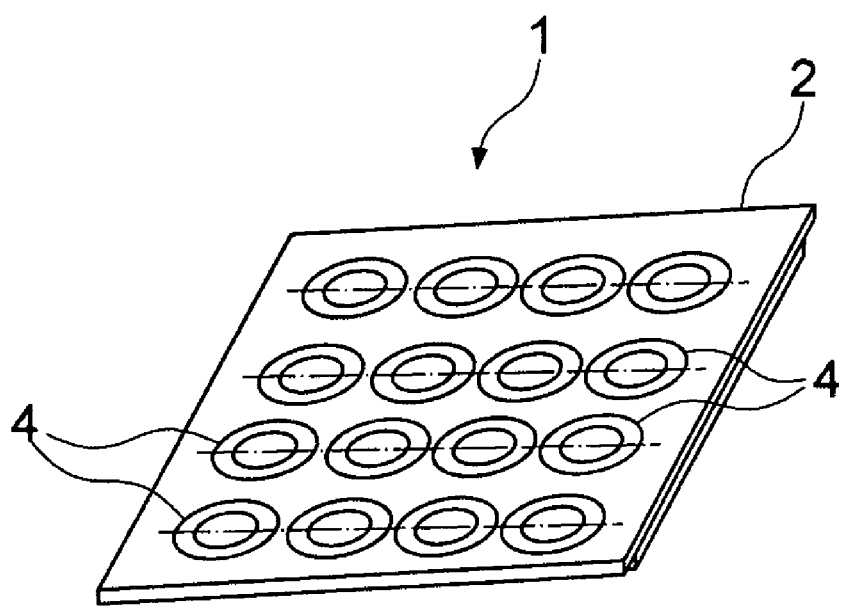
FIG. 1 shows a perspective wire frame model of the sound absorbing element according to an embodiment.

FIG. 1 shows a perspective view of a sound absorbing element 1 according to an embodiment, where the sound absorbing element 1, a first wall area 2 and a second wall area 3 (shown in FIG. 2) are arranged so as to be spaced apart by a plurality of spring elements 4, which are saucer springs 4, in the arrangement shown. For the sake of clarity, the first wall area 2 is shown to be transparent, in order to better show an interior of the sound absorbing element 1 according to one embodiment. In this arrangement, the saucer springs 4 are arranged in a regular rectangular grid relative to each other so that, as even as allowable, a decoupling of the first wall area 2 from the second wall area 3 is achieved.

Figure 2:
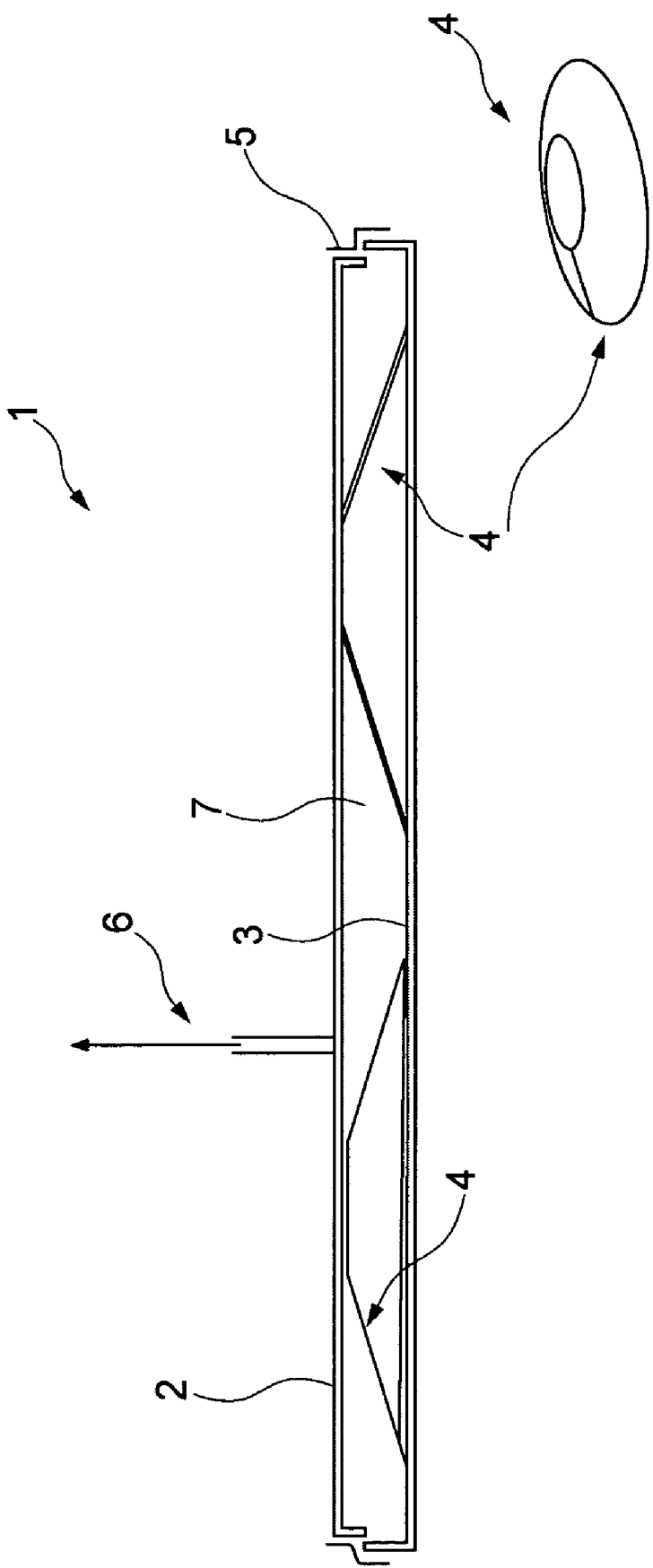
FIG. 2 shows a cross section of a sound absorbing element according to an embodiment.

As may better be seen in FIG. 2, the first wall area 2 and the second wall area 3 are arranged spaced apart from each other by a clear space 7. In this clear space 7 in the embodiment shown, two saucer springs 4 are arranged, which connect the first wall area 2 and the second wall area 3 with each other. While the saucer springs 4 may be pre-tensioned in any manner desired, provided no contact arises between the wall areas 2, 3, however, there is a particularly simple option of pre-tensioning the saucer springs 4 such that negative pressure is applied to the clear space 7 using a suction 6, as a result of which, the saucer springs 4 are pre-tensioned. In order to maintain negative pressure that has been generated in this manner, in the clear space 7 over time, the sound absorbing element 1 is bordered on the rims of the first wall area 2 and the second wall area 3 by a flexible rubber sealing element 5, which seals the clear space 7 from the exterior atmosphere. As an alternative to this, the negative pressure may be set and maintained by way of a suction pump that is connected to the suction 6. Negative pressure may mean that the pressure is lower than a pressure that is present in a space outside of the clear space, e.g. a pressure which is lower than an air pressure of the ambient air.

Figure 3:
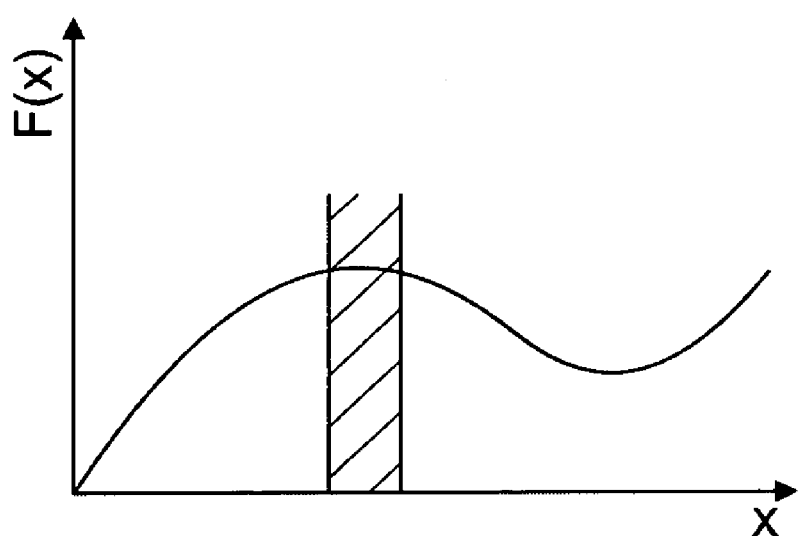
FIG. 3 shows a spring function of a spring element of the sound absorbing element according to an embodiment.

With reference to FIG. 3, a spring function F(x) is presented, schematically. An example of F(x) versus displacement (x) for a saucer spring 4 is illustrated for implementing decoupling of a first wall area 2 from the second wall area 3. The diagram of FIG. 3 schematically illustrates the distance x (or excursion) on the x-axis, and the spring force or load F(x) on the y-axis. Starting from zero, the spring force increases less than proportionally up to a maximum of the spring function F(x). A spring function of this type is generally referred to as being decreasing or declining from the origin to the maximum. Since as it is well known, the slope in the spring function at any position x represents the spring constant of the spring, the spring constant, as shown in FIG. 3, is maximum at the point of origin. At that origin, the slope of the spring function is at a maximum. As the spring function F(x) increases with x, the slope continuously decreases, which means that the spring constant is continuously decreasing too. Now at the maximum value of the spring function F(x) the slope of F(x) of the spring function F(X) equals zero, which means that the spring constant is zero at this point.

If a saucer spring 4 is pre-tensioned up to the region around the point where the spring constant is zero, then with a further dynamic displacement of the saucer spring as a result of a sound, the saucer spring 4 no longer transmits additional loads from one wall 112 to another 3. Use of such an arrangement of a pre-tensioned saucer spring achieves for reaching decoupling. In one example, the best decoupling result is achieved by pre-tensioning a saucer spring precisely to the point where the slope is zero, but this may be difficult in practice. Therefore, in one example, saucer springs 4 are pre-tensioned to such an extent that the value of the slope ∂F(x)/∂x is less than 5% of the maximum slope ∂F/∂x the entire region of the spring function F(x). In the example illustrated in FIG. 3, the maximum slope is at x=0, the origin. In FIG. 3, a hatched region is illustrated in which a load capacity is high and the spring constant is low, i.e.

$$\frac{dF}{dx} \approx 0.$$

or the slope is about zero, wherein about is defined as a slope less than 5% of the maximum slope of the F(x) versus x curve.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE SIGNS

| | |
|---|---|
| 1 | Sound absorbing element |
| 2 | First wall area |
| 3 | Second wall area |
| 4 | Spring element |
| 5 | Sealing element |
| 6 | Suction |
| 7 | Clear space |

The invention claimed is:

1. A sound absorbing element comprising:
a first wall area;
a second wall area; and
a plurality of spring elements;
wherein the first wall area and the second wall area are arranged so as to be spaced apart from each other by a clear space, in which clear space the plurality of spring elements being arranged in the clear space, the plurality of spring elements connecting the first wall area and the second wall area to each other, and wherein each of the plurality of spring elements is pre-tensioned for decoupling the first wall area from the second wall area; and a negative pressure is applied to the clear space, as a result of which pressure, the plurality of spring elements are pre-tensioned,
wherein each of the plurality of spring elements has a spring function within at least one region in which a slope approaches zero,
wherein the plurality of spring elements are pre-tensioned up to a region in which the value of the slope is less than 5% of the maximum value of the slope in an entire region of the spring function.

2. The sound absorbing element of claim 1, wherein each of the plurality of spring elements has a spring characteristic function at least in part with a decreasing region.

3. The sound absorbing element of claim 1, wherein the plurality of spring elements are formed as saucer springs.

4. The sound absorbing element of claim 1, further comprising:
a sealing element that borders the first wall area and the second wall area and that seals the clear space from the atmosphere.

5. An aircraft comprising at least one component of the group of components consisting of an ice protection shield and a fuselage skin, wherein the at least one component is designed as a sound absorbing element of claim 1.

6. A method for producing a double-shell sound absorbing element, comprising the steps of:
connecting a first wall area to a second wall area using a plurality of spring elements such that the first wall area and the second wall area are arranged spaced apart from each other by a clear space; and
pre-tensioning of the plurality of spring elements such that the first wall area and the second wall area are dynamically decoupled, wherein negative pressure is applied to the clear space, such that pretensioning of the plurality of spring elements takes place,
wherein the step of connecting selects each of the plurality of spring elements to have a spring function within at least one region in which a slope approaches zero, and the step of pre-tensioning of the plurality of spring elements takes place up to a region in which the value of the slope is less than 5% of the maximum value of the slope in an entire region of the spring function.

7. The method of claim 6, further comprising a step of:
sealing the clear space off from the atmosphere with a sealing element that borders the first wall area and the second wall area.

* * * * *